United States Patent
Kasahara

[11] Patent Number: 5,263,014
[45] Date of Patent: Nov. 16, 1993

[54] OPTICAL HEAD
[75] Inventor: Akihiro Kasahara, Kawasaki, Japan
[73] Assignee: Kabushiki Kaisha Toshiba, Kawasaki, Japan
[21] Appl. No.: 857,182
[22] Filed: Mar. 25, 1992
[30] Foreign Application Priority Data
  May 21, 1991 [JP]  Japan .................. 3-116098
[51] Int. Cl.[5] .................. G11B 7/00
[52] U.S. Cl. .................. 369/112; 369/44.11; 369/44.14; 359/209
[58] Field of Search ......... 369/112, 119, 110, 100, 369/44.11, 44.14; 359/209, 210, 211

[56] References Cited
U.S. PATENT DOCUMENTS

| 4,414,684 | 11/1983 | Blonder | 359/211 |
| 4,969,137 | 11/1990 | Sugiyama et al. | 369/112 |
| 5,072,436 | 12/1991 | Honda | 369/112 |
| 5,140,572 | 8/1992 | Kibune et al. | 369/44.12 |

FOREIGN PATENT DOCUMENTS
1-298526 12/1989 Japan .

Primary Examiner—Paul M. Dzierzynski
Assistant Examiner—Drew A. Dunn
Attorney, Agent, or Firm—Finnegan, Henderson, Farabow, Garrett & Dunner

[57] ABSTRACT

An optical adjusting unit comprises a cylindrical block base, cylindrical holders rotatably attached to both ends of the block base, and first and second light-transmission plate-like members attached to the top ends of these cylindrical holders at a predetermined angle to an optical axis. The center of the hole of each of the holders is arranged to be consistent with the center of the optical axis, and independently rotates around the center of the optical axis by sliding these holders on the receiving surface of the block base.

8 Claims, 4 Drawing Sheets

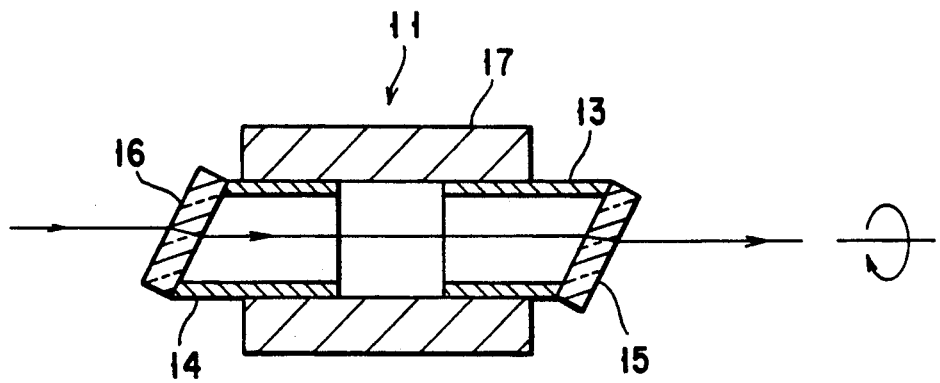
F I G. 2
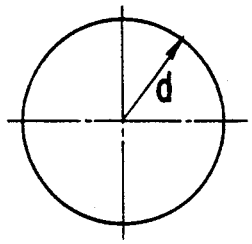
F I G. 3A
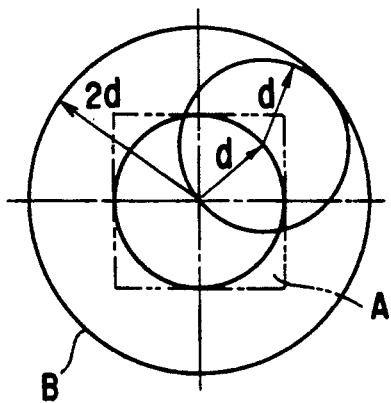
F I G. 3B

OPTICAL HEAD

BACKGROUND OF THE INVENTION

1. Field of the Invention

The present invention relates to an optical head using an access mechanism of separation optical type.

2. Description of the Related Art

A conventional access mechanism of separation optical type comprises afixed.

A fixing optical unit a movable optical unit. A laser beam emitted from the fixed optical unit is reflected on a rotation mirror in the movable optical unit and changed in a direction which is a substantially perpendicular to an optical axis. The laser beam passes through a lens diaphragm and is condensed by an objective lens, and focused on a recording film on an optical disc. The laser beam reflected from the optical disc passes through the original passage, and is returned to a photo detector (not shown) provided in the fixed optical unit, and a signal, which is recorded in the recording film on the optical disc in advance, is read out. The movable optical unit is structured to be movable from an inner periphery of the optical disc to an outer periphery.

However, following problems are found in the conventional access mechanism.

The optical axis of the fixed optical unit and that of the movable optical unit are shifted. The objective lens is stopped by the lens diagram, so that the distribution of light density becomes asymmetric.

In a case where the distribution of light density becomes asymmetric, the output characteristic of a tracking error signal and that of a focus error signal are made offset. If the above asymmetry exceeds in an allowable value, there occurs trouble in accurately positioning the objective lens, and the signal is prohibited from being stably read.

Due to this, in the prior art, there were taken measures to considerably manage the accuracy of manufacturing the respective parts. However, it was difficult to assembly the apparatus with a sufficient accuracy.

In order to solve the above problem, there has been contrived a method in which alignment of the optical axis in a Y direction and that of the optical axis in a Z direction are controlled by adjusting an inclination angle of a light-transmission parallel plane, which rotates in a direction of a Z axis, and an inclination angle of a light-transmission parallel plane, which rotates in a direction of a Y axis. However, in this case, an adjusting range is narrow.

If the inclination angles of the parallel planes are enlarged, the adjusting range can be widened. However, in this case, luminous energy of transmission decreases and the phase changes, so that an optical characteristic may be deteriorated.

SUMMARY OF THE INVENTION

In consideration of the above problems, an object of the present invention is to provide an optical head which can adjust the shift of an optical axis in a wide range even at a small inclination angle.

An optical head of the present invention comprises first optical means, provided to be fixed, for emitting a laser beam; second optical means, provided to be movable and apart from the first optical means, for focusing the laser beam emitted from the first optical means on the data storing medium; and optical axis adjusting means, having first and second light-transmission plate-like members provided to be rotatable around an optical axis of the laser beam emitted from the first optical means at a predetermined angle to the optical axis, for adjusting the optical axis of the laser beam to the optical axis of the second optical means by the rotations of the first and second plate-like members.

Additional objects and advantages of the invention will be set forth in the description which follows, and in part will be obvious from the description, or may be learned by practice of the invention. The objects and advantages of the invention ma be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 2 is a side cross sectional view showing an optical axis adjusting apparatus which is provided in the optical head of FIG. 1;

FIGS. 3A and 3B are explanatory views explaining an optical axis adjusting range of the optical adjusting apparatus of FIG. 2;

DETAILED DESCRIPTION OF THE PREFERRED EMBODIMENTS

An embodiment of the optical head of the present invention will be explained with reference to FIGS. 1 to 3.

Figure 1:
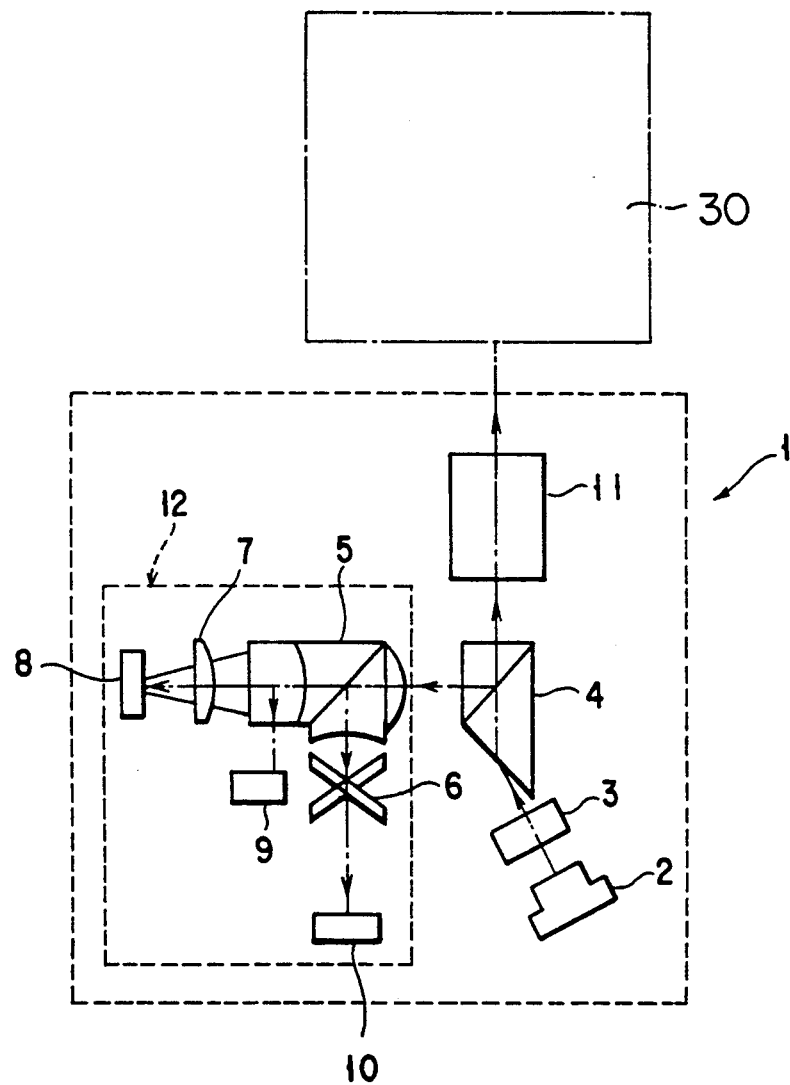
FIG. 1 is a structural view showing a fixed optical unit of an optical head of one embodiment of the present invention.

FIG. 1 shows the several components of the optical head. The optical head reproduces data from an optical (FIG. 3) by radiating a laser beam, the optical disc 39 serving as a data storing medium. In FIG. 1 reference numeral 1 designates a fixed optical unit serving as first optical means. In the fixed optical unit 1, a laser diode 2 is provided.

In an optical path of light oscillated from the laser diode 2, a collimator lens 3 and a first compound prism 4 are provided.

Moreover, a light receiving unit 12 is provided in the fixing optical unit 1. In the light receiving unit 12, a second compound prism 5, a cross plate 6, a focusing lens 7, a first photo detector 8, a second photo detector 9, and a third photo detector 10 are provided.

Furthermore, an optical adjusting unit 11 serving as optical axis adjusting means is provided in the fixed optical unit 1. In the drawing, reference numeral 13 is a movable optical unit serving as second optical means.

Figure 4:
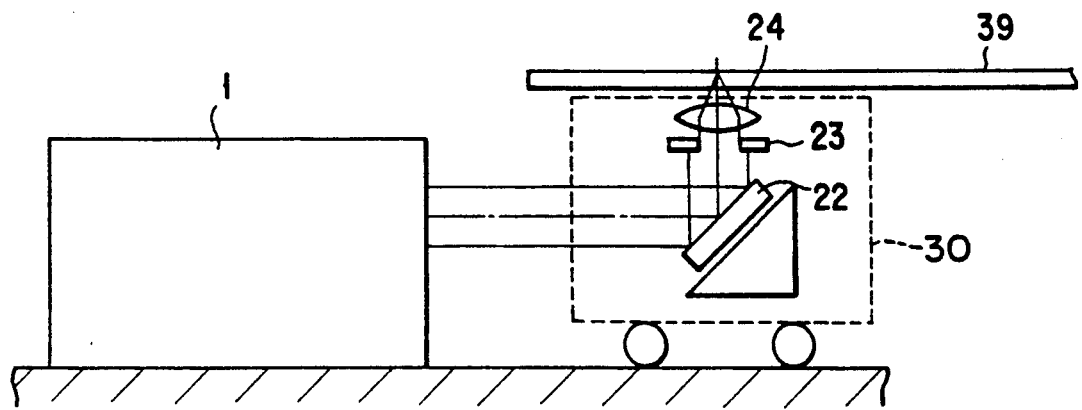
FIG. 4 is a structural view showing a movable optical unit of the optical head of FIG. 1.

As shown in FIG. 4, a rotation mirror 22, a lens diaphragm 23, and an objective lens 24 are arranged in the movable optical unit 30. The movable optical unit 13 is movable in a radial direction of the optical disc 39 so as to radiate the laser beam to a predetermined position of a recording truck, which is concentrically or spirally formed in the optical disc 39.

If a laser beam is emitted from the laser diode 2 of the fixed optical unit 1, the laser beam passes through the collimator lens 3, and becomes a parallel beam as shown in FIG. 1. Then, the parallel beam passes through the first compound prism 4, and the distribution of intensity of the beam is changed from an elliptical form to a circular form. The laser beam passes through the optical adjusting unit 11 and the optical axis is corrected. Then, the laser beam is directed to the movable optical unit 30. As shown in FIG. 4, the laser beam entering the movable optical unit 30 is reflected on the rotation mirror 22, and is changed to be substantially perpendicular to the direction of the optical axis. The laser beam passes through the lens diaphragm 23, and is condensed by the objective lens 24, and focused on a recording film on the the optical disc 39. The laser beam reflected on the optical disc 39 is returned to the original path. The laser beam passes through the first compound prism 4 of the fixed optical unit 1 and sent to the second compound prism 5. Moreover, the laser beam is sent to the first photo detector 8 through the focusing lens 7 from the second compound prism 5. Also, the laser beam is sent to the third photo detector 10 through the cross plate 6. Further, the laser beam is sent to the photo detector 9. Thereby, the signal is detected.

FIG. 2 shows the structure of the optical axis adjusting unit 11.

In the drawing, reference numeral 17 designates a cylindrical block base serving as a fitting member. Cylindrical holders 13 and 14 are rotatably attached to both sides of the block base. Moreover, parallel plates 15 and 16, serving as first and second light-transmission plate-like members, are attached to the top ends of the first and second cylindrical holders 13 and 14 in a state that they are inclined at a predetermined angle.

The center of the hole of each of the holders 13 and 14 is arranged to be consistent with the center of the optical axis, and independently rotates around the center of the optical axis by sliding the first and second holders 13 and 14 on the receiving surface of the block base 17.

If the first holder 13 is rotated, the first parallel plate 15 rotates in a state that the plate 15 is inclined. As shown in FIG. 3A, the optical axis can be made offset at an arbitrary position on the circumference around the center of the optical axis in a state that no first parallel plate 15 is provided.

Similarly, if the second holder 14 is rotated, the second parallel plate 16 rotates in a state that the plate 16 is inclined. As shown in FIG. 3A, the optical axis can be made offset at an arbitrary position on the circumference around the center of the optical axis in a state that no second parallel plate 16 is provided.

In other words, each of the parallel plates 15 and 16 can be moved by a constant distance d, which is determined by the inclination angle of each parallel plates, from the original position of the optical axis. The direction of the movement is determined by the direction of each of the parallel plates 15 and 16.

Due to this, the direction of each of two parallel plates 15 and 16, each having the same quantity of inclination, is controlled so that the optical axis can be made offset at an arbitrary position in the circumference of a radius 2d as shown in FIG. 3B.

If the adjusting range B in the circumference of the radius 2d is compared with the conventional adjusting range A, the adjusting range B of the present invention is larger than the conventional adjusting range A as shown in FIG. 3B.

Due to this, even if the inclination angles of the first and second parallel plates 15 and 16 are small, the adjusting range B can be sufficiently obtained. Moreover, luminous energy of transmission does not decrease and the phase does not change, so that the optical characteristics of transmitted light are not deteriorated.

The present invention is not limited to the above-mentioned embodiment. Even if the apparatus is structured as shown in FIG. 5, the same technical advantage as the above embodiment can be brought about.

Figure 5A:
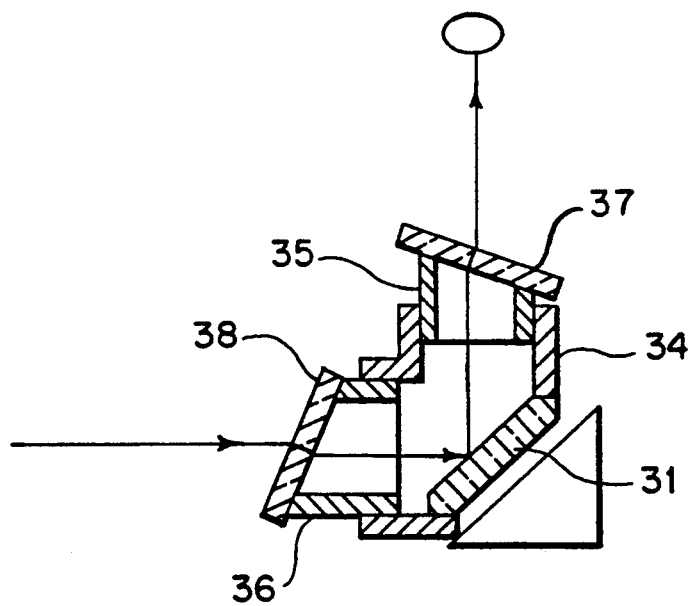
FIG. 5A is an enlarged cross-sectional view, similar to FIG. 2, but relating to the embodiment illustrated in FIG. 5.
Figure 5:
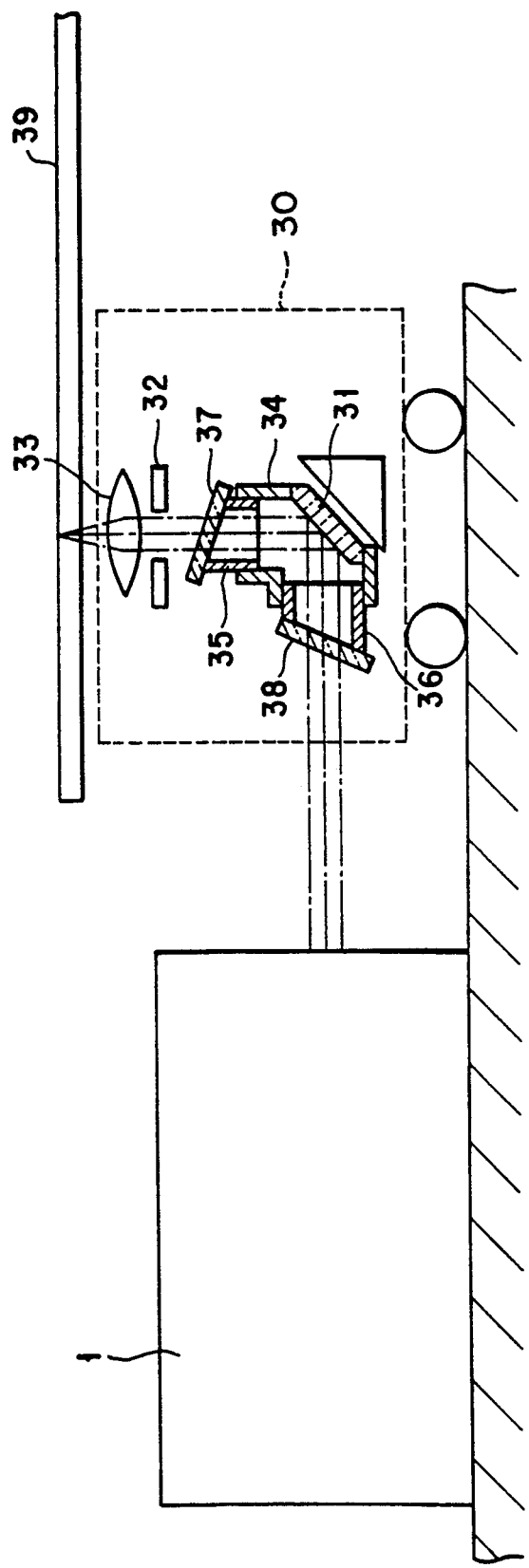
FIG. 5 is a structural view showing an optical head comprising an optical axis adjusting apparatus according to the other embodiment of the present invention.

More specifically, in FIG. 5, reference numeral 31 designates an upright mirror provided in the movable optical unit 13 at an angle of substantially 45°. A lens diaphragm 32 and an objective lens 33 are provided in the upper portion of the upright mirror 31. An optical disc 39 is provided to be opposed to the objective lens 33.

The upright mirror 31 is attached to the corner of a block base 34 serving as a cylindrical fitting member at right angles to the upright mirror 31. First and second cylindrical holders 35 and 36 are rotatably attached to both ends of the block base 34. Light-transmission plate-like members 37 and 38 are attached to the top ends of the first and second cylindrical holders 35 and 36 in a state that they are inclined at a predetermined angle to the the optical axis of the laser.

Due to this, if the first holder 35 is rotated, the light-transmission plate-like member 37 rotates in a state that the plate-like member 37 is inclined. As shown in FIG. 3A and FIG. 5A, the optical axis can be made offset at an arbitrary position on the circumference around the center of the optical axis in a state that no plate-like member 37 is provided.

Similarly, if the second holder 36 is rotated, the plate-like member 38 rotates in a state that the plate-like member 38 is inclined. As shown in FIG. 3A and FIG. 5A, the optical axis can be made offset at an arbitrary position on the circumference around the center of the optical axis in a state that no plate-like member 38 is provided.

In other words, each of the plate-like member 37 and 38 can be moved by a constant distance d, which is determined by the inclination angle of each plate-like members, from the original position of the optical axis. The direction of the movement is determined by the direction of each of the parallel plates 15 and 16.

Due to this, the direction of each of two plate-like members 37 and 38, each having the same quantity of inclination, is controlled so that the optical axis can be made offset at an arbitrary position in the circumference of a radius 2d as shown in FIG. 3B.

As mentioned above, according to the present invention, the adjusting range of the shift of the optical axis can be enlarged without increasing the inclination angles of the light-transmission plate-like members. Moreover, luminous energy of transmission does not decrease and the phase does not change, so that the optical characteristics of transmitted light are not deteriorated. Due to this, there can be obtained the technical advantage in which the shift of the optical axis can be sufficiently controlled.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An optical head, which reproduces data from a data storing medium by radiating a laser beam to the data storing medium, comprising:

first optical means, provided to be fixed, for emitting a laser beam;

second optical means, provided to be movable and apart from said first optical means, for focusing said laser beam emitted from said first optical means on the data storing medium; and optical axis adjusting means, having first and second light-transmission plate-like members provided to be independently rotatable around an optical axis of said laser beam emitted from said first optical means at a predetermined angle to the optical axis, for adjusting the optical axis of said laser beam to the optical axis of said second optical means by the rotations of said first and second plate-like members.

2. The optical head according to claim 1, wherein inclination angles of said first and second plate-like members to the optical axis are relatively equal to each other.

3. The optical head according to claim 1, wherein said optical axis adjusting means is provided in said first optical means.

4. The optical head according to claim 1, wherein said optical axis adjusting means is provided in said second optical means.

5. An optical head, which reproduces data from a data storing medium by radiating a laser beam to the data storing medium, comprising:

first optical means, provided to be fixed, for emitting a laser beam;

second optical means, provided to be movable and apart from said first optical means, for focusing said laser beam emitted from said first optical means on the data storing medium; and optical axis adjusting means, having a cylindrical fitting member having two ends and a pair of holding members freely rotating around the optical axis of the laser beam in both ends of the fitting member, and first and second light-transmission plate-like members provided to be rotatable around an optical axis of said laser beam emitted from said first optical means at a predetermined angle to the optical axis and held by the paired holding members at a predetermined angle to the optical axis of the laser beam, for adjusting the optical axis of said laser beam to the optical axis of said second optical means by the rotations of said first and second plate-like members.

6. The optical head according to claim 5 wherein inclination angles of said first and second plate-like members to the optical axis are relatively equal to each other.

7. The optical head according to claim 5, wherein said optical axis adjusting means is provided in said first optical means.

8. The optical head according to claim 5, wherein said optical axis adjusting means is provided in said second optical means.

* * * * *